Patented Sept. 17, 1946

2,407,861

UNITED STATES PATENT OFFICE 2,407,861

PROCESS OF TREATING HYDROCARBONS

I. Louis Wolk, Bartlesville, Okla., assignor to Phillips Petroleum Company, a corporation of Delaware No Drawing. Application September 5, 1942, Serial No. 457,471

2 Claims. (Cl. 202—57)

The present invention relates to the stabilization of polymerizable organic compounds against polymerization and oxidation during concentration and purification and to stabilizers capable of preventing the polymerization and deterioration of the polymerizable compounds.

Among the most important monomers used at the present time in the manufacture of synthetic rubber are the unsaturated hydrocarbons: butenes, butadiene 1.3, piperylene, and their derivatives. Acrylonitrile, styrene, methyl acrylate, and other polymerizable organic compounds may be copolymerized with the unsaturated hydrocarbons to yield various rubber-like polymers having characteristic properties. The polymerization is advantageously carried out in an emulsion. For emulsion polymerization the monomeric components must be relatively concentrated and substantially free from compounds which have an adverse effect on the polymerization. Solvent treatment, distillation, or both, may be employed in the purification and concentration of the monomers. While distillation is in many cases preferred as the operation by which the monomers are concentrated and purified, considerable difficulty has been experienced due to polymer formation during distillation. In some instances of record in the distillation of butadiene the entire distillation equipment has become so filled with material deposited on the surfaces of the equipment that the distillation had to be interrupted while the still, fractionator, and condenser were cleaned out. During transfer and storage of the purified monomers, stabilizers are added to protect against deterioration. Most of these stabilizers interfere with the polymerization and must be removed prior to the polymerization process. Stabilizers of high boiling point are most often used because they may be separated from the monomer by distillation prior to the polymerization procedure. Polymer formation and decomposition of the monomer, chiefly by oxidation, are apt to take place in the equipment used for separation of the stabilizer from the monomer. In the steam distillation of styrene, for example, for separation from the stabilizer prior to use in polymerization, considerable trouble with polymer formation is encountered.

In the conventional fractionating systems, the inclusion or introduction of atmospheric or other oxygen in the equipment results in or favors oxidation and polymerization of these unsaturated organic compounds with the attendant losses in yield and deposition of polymers in the apparatus and system. The conjugated diolefins are especially likely to undergo such reactions and hence, are especially troublesome. This condition obviously is undesirable and results in substantial losses of the monomers as well as giving rise to the numerous operating difficulties. The loss of even very small amounts of unsaturates through oxidation or polymerization may become an important economic factor over a long period of time, while the delays caused by the necessity of removing the polymers formed may also be an important cost factor. This action may take place even at ordinary temperatures and the condition is aggravated by the elevated temperatures required for distillation. The iron oxides and sulfides frequently found in stills and fractionating columns promote these undesirable reactions.

An object of the present invention is to eliminate oxidation and polymerization of polymerizable unsaturated organic compounds during their concentration and purification by distillation.

A further object of the present invention is the prevention of losses of unsaturated compounds being recovered and prevention of deposition of polymeric materials and/or decomposition products on the apparatus during distillation.

Another object of the present invention is to provide an effective and desirable method for the distillation of polymerizable organic compounds.

Still another object is to provide suitable stabilizers capable of inhibiting vapor phase polymerization and/or oxidation during the distillation of polymerizable organic compounds.

The present invention effectively prevents the formation of polymers during fractionation as well as during the other operations preceding the polymerization step. With the high boiling inhibitors previously used, the inhibitor remains in the liquid phase in the fractionator and tends to concentrate near the bottom of the fractionator. In some instances, fractionators may be constructed of or contain certain metals or other materials which inhibit polymerization. Both the high boiling inhibitor and the contact inhibitor are ineffective for inhibition of the oxidation and/or polymerization of the monomer in the vapor phase. I have observed that considerable polymer formation does occur in distillation of monomers which contain non-volatile or high boiling inhibitors. Since these inhibitors are effective for the stabilization of the liquid monomers in transfer and storage, polymerization in the vapor phase must take place during the fractionation. The present invention prevents decomposition of the monomers in the vapor phase by the addition of volatile stabilizers which coexist in the vapor phase with the unstable organic compounds distilled. The volatile stabilizers of my invention may be used alone or in conjunction with high boiling or non-volatile inhibitors.

The present invention is performed by adding to the monomer an inhibitor having a suitable boiling point and solubility for incorporation in the liquid material to be purified or in the water if steam distillation is employed in the purification. The selection of a suitable stabilizer is dependent upon the particular monomer to be inhibited thereby. Preferably the inhibitor or stabilizer has approximately the same boiling point as the monomer so as to prevent oxidation and polymerization during all the process steps preceding the polymerization step in which it is copolymerized with another monomer to form synthetic rubber latex. One addition of such a stabilizer is usually sufficient since the stabilizer remains in admixture with the monomer through all the process steps. In any event, at least part of the inhibitor exists in the vapor phase during distillation. The boiling point of the inhibitor may be such that it is entirely gaseous at the temperature and pressure of the distillation. I may use a mixture of the inhibitors, part lower boiling and part higher boiling than the compound inhibited or I may use a volatile inhibitor in conjunction with a conventional inhibitor. The stabilizer may be removed prior to the polymerization step as disclosed hereinafter or may in some instances be allowed to remain in the monomer since some of the stabilizers, although effective in preventing deterioration of the monomer, do not appreciably retard copolymerization.

The aliphatic amines, particularly the tertiary aliphatic amines, the mercaptans, and the alkyl sulfides may, for example, be allowed to remain in the monomers charged to the emulsion polymerization step without adversely affecting the polymerization.

The inhibitors may be employed equally advantageously in the segregation and purification of the monomers by methods other than by simple distillation. For example, separations sometimes involve the formation of an azeotrope or use of an entrainer to aid in the fractionation. The invention is also applicable to separation by the use of selective solvents.

The invention will be more readily understood by reference to the following examples which are illustrative of the process of my invention and of compounds suitable for use in carrying out my invention.

My invention is applicable to the olefins, diolefins, styrene, acrylonitrile, and other polymerizable and/or oxidizable unsaturated compounds. Among the olefins and diolefins are the members of these series having four carbon atoms and five carbon atoms respectively and having boiling points as follows:

| Hydrocarbon | Boiling point | |
|---|---|---|
| | °C. | °F. |
| Isobutene | −7 | 19 |
| Butene-1 | −6 | 21 |
| Butadiene-1,3 | −5 | 23 |
| Butene-2 (low boiling) | 1 | 34 |
| Butene-2 (high boiling) | 4 | 39 |
| 1,4-pentadiene | 26 | 79 |
| Pentene-1 | 30 | 86 |
| 2-methyl butene-1 | 31 | 88 |
| Isoprene | 34 | 93 |
| Pentene-2 | 36 | 97 |
| 2-methyl butene-2 | 38 | 100 |
| Cyclopentadiene | 41 | 106 |
| Piperylene | 43 | 109 |
| Cyclopentene | 44 | 111 |

Of these, isobutene, butadiene, isoprene, and piperylene are the most important in the manufacture of synthetic rubber.

Other polymerizable organic materials of importance in the manufacture of synthetic rubber include:

| Compound | Boiling point | |
|---|---|---|
| | °C. | °F. |
| Vinyl chloride | −14 | 7 |
| Chloroprene | 59 | 139 |
| 2,3-dimethyl butadiene-1,3 | 70 | 157 |
| Acrylonitrile | 78 | 173 |
| Methyl acrylate | 80 | 177 |
| Styrene | 146 | 295 |

Of the stabilizers or inhibitors suitable for use in the present invention, the aliphatic alkyl amines are preferred, since the amines may be tolerated in minor proportions in the polymerization step and in the resulting product. For the purpose of illustration, the boiling points of some of the aliphatic amines are listed below:

| Compound | Boiling point | |
|---|---|---|
| | °C. | °F. |
| Methylamine | −7 | 19 |
| Trimethylamine | 4 | 39 |
| Dimethylamine | 7 | 45 |
| Ethylamine | 17 | 63 |
| Isopropylamine | 34 | 93 |
| Methylethylamine | 35 | 95 |
| Tert.-butylamine | 45 | 113 |
| Propylamine | 49 | 120 |
| Diethylamine | 56 | 133 |
| Sec.-butylamine | 63 | 145 |
| N-methyl-propylamine | 63 | 145 |
| Methyldiethylamine | 64 | 147 |
| Isobutylamine | 68 | 154 |
| Ethylisopropylamine | 76 | 169 |
| Butylamine | 77 | 171 |
| Methylisobutylamine | 77 | 171 |
| Tert.-amylamine | 79 | 174 |
| Dimethylpropylamine | 82 | 180 |
| Diisopropylamine | 84 | 183 |
| Triethylamine | 90 | 194 |
| N-methyl-butylamine | 91 | 196 |
| Ethylpropylamine | 91 | 196 |
| Methyl-butylamine | 92 | 198 |
| Isoamylamine | 95 | 203 |
| Amylamine | 104 | 219 |
| Dipropylamine | 110 | 230 |
| Isohexylamine | 124 | 255 |
| Hexylamine | 129 | 264 |
| Methylamylamine | 130 | 266 |
| Diisobutylamine | 140 | 284 |
| Ethylpropylisobutylamine | 146 | 295 |
| Heptylamine | 155 | 311 |
| Tripropylamine | 156 | 313 |
| N. dibutylamine | 159 | 318 |
| Sec.-octylamine | 164 | 327 |
| Methyl heptylamine | 165 | 329 |

From a comparison of the boiling points it will be apparent that methylamine, trimethylamine, and dimethylamine are suitable for use in a mixture of C4 hydrocarbons, while the ethylamine, isopropylamine, and methylethylamine are suitable for use with the C5 hydrocarbons. Ethylpropylisobutylamine is especially suited for use with styrene since the boiling points are substantially identical. For inhibition of the higher boiling polymerizable organic compounds including styrene, however, it is preferable to use a mixture of acid soluble aliphatic amines boiling within the range of temperatures encountered in the distillation of the organic compounds. Such a mixture offers full protection against deterioration during distillation since the components are distributed through both the liquid phase and the vapor phase in the fractionator. The inhibitor passing overhead in the fractionator is condensed with the condensate and may be removed from the monomer by contact with an aqueous acid solution. The removal is readily accomplished by intimately contacting the monomer with the aqueous acid solution and separating the purified monomer from the resulting mixture.

The mercaptans may also be used as inhibitors in accordance with the present invention. The boiling points of some of the mercaptans suitable for use are as follows:

| Compound | Boiling point | |
|---|---|---|
| | °C. | °F. |
| Methyl mercaptan | 6 | 43 |
| Ethyl mercaptan | 36 | 97 |
| Isopropyl mercaptan | 59 | 138 |
| N. propyl mercaptan | 67 | 152 |
| Isobutyl mercaptan | 88 | 190 |
| N. butyl mercaptan | 98 | 208 |
| N. amyl mercaptan | 125 | 257 |
| Isoamyl mercaptan | 130 | 266 |
| N. hexyl mercaptan | 149 | 300 |

Methyl and ethyl mercaptans are suitable for use in a mixture of C$_5$ hydrocarbons, ethyl mercaptan having the same boiling point as pentene-2. Isopropyl mercaptan has substantially the same boiling point as isoprene. N. propyl mercaptan, as well as the lower boiling mercaptanes, may be used as inhibitor for 2,3 dimethyl butadiene-1,2, acrylonitrile, and methyl acrylate. In the distillation of styrene, the butyl and amyl mercaptans and n. hexyl mercaptans are particularly suited for use as inhibitors, while the lower boiling mercaptans may also be used. The mercaptans are readily removed from the polymerizable organic liquid prior to the polymerization step by contact with an aqueous alkaline solution. The alkali wash serves to remove organic peroxides as well as the mercaptans. Traces of alkali in the monomer are not objectionable in emulsion polymerization.

The alkyl sulfides may be used in my process. Those having suitable boiling points are:

| Compound | Boiling point | |
|---|---|---|
| | °C. | °F. |
| Methyl sulfide | 38 | 100 |
| Methylethyl sulfide | 67 | 152 |
| Ethyl sulfide | 92 | 198 |
| Ethyl n-propyl sulfide | 116 | 241 |
| N. propyl sulfide | 142 | 286 |
| Sec-butyl sulfide | 165 | 329 |

Methyl sulfide may be used as inhibitor in the distillation of the C$_5$ hydrocarbons and chloroprene or higher boiling polymerizable compounds. Methylethyl sulfide is especially suitable as inhibitor for 2,3-dimethyl butadiene,1,3 and may be used with acrylonitrile or methyl acrylate. N. propyl sulfide is especially suitable for use with styrene, although the lower boiling sulfides may also be used for inhibition of polymerization in the vapor phase while the butyl sulfides may be used for inhibition in the liquid phase. The alkyl sulfides may be removed prior to the polymerization step by contacting the monomer with a mercuric or cupric salt with which the sulfides form addition products.

Another series of compounds suitable for use in my process are the lower boiling alkyl hydrazines.

| Compound | Boiling point | |
|---|---|---|
| | °C. | °F. |
| Dimethylhydrazine (uns.) | 63 | 145 |
| Dimethylhydrazine (sym.) | 81 | 178 |
| Methylhydrazine | 87 | 188 |
| Diethylhydrazine | 98 | 208 |
| Ethylhydrazine | 102 | 214 |

The dimethyl hydrazines may be used as inhibitors with 2,3-dimethyl butadiene-1,3, acrylonitrile, and methyl acrylate. Any of the alkyl hydrazines enumerated may be used as inhibitors for styrene since they all will be vaporized at temperatures below those at which the styrene is vaporized. The alkyl hydrazines are powerful reducing agents and are especially effective in preventing oxidation of the unsaturated compounds with which they are used as inhibitors. Like the aliphatic amines, the dimethyl hydrazines may be removed from the hydrocarbons by contact with an aqueous acid solution.

Other inhibitors which may be used in my process include ammonia, B. P. −33° C., and hydrogen sulfide, B. P. −60° C. The normally gaseous compounds may be used as inhibitors in the vapor phase during the distillation of the polymerizable compounds by dissolving in small proportions in the compounds or by addition directly to the still whereby the gases are admixed with and follow the volatile vapors from the still through the fractionation steps. The ammonia may be removed by a water wash, while the hydrogen sulfide is preferably removed by contact with aqueous alkaline solution.

The following examples illustrate more clearly the application of the present invention and are not to be construed as limiting the invention in any way.

*Example I*

A mixture containing 50% butadiene along with a substantial proportion of butenes-2 as impurities is fed to a distillation system comprising a packed column operated at about 75 pounds per square inch absolute and with a kettle temperature of about 113° F. Butadiene of about 98% purity is taken overhead and butene removed from the bottom. Phenyl-beta-naphthylamine about .05% by weight, is used as inhibitor. After operating 48 hours, the distillation system was torn down and cleaned out because the system was so plugged that operation was impossible. A large amount of pasty material was found in the still. The column was stopped by a solid white crystalline deposit. The first pass of the condenser was packed with a mixture of the white deposit and Raschig rings which had carried over as the result of the formation of the butadiene complex.

The above described system was cleaned out and distillation of butadiene continued with the use of .5% methylamine and .05% phenyl-beta-naphthylamine as inhibitors. After 48 hours the distillation system was operating satisfactorily. The methylamine was removed from the butadiene by an aqueous acid treatment. About 1% hydrogen sulfide was substituted for methylamine, being added continuously to the base of the fractionator, and the distillation continued 24 hours. The hydrogen sulfide was removed by contact with an aqueous alkaline solution. The distillation was then continued 24 hours using small amounts of ammonia, about 1% by weight, instead of the hydrogen sulfide, continuously introduced to the system with the feed. The distillation was shut down at the end of four days. A small amount of pasty material was found in the still. The column was not disassembled since the pressure drop through the column had not appreciably increased from the beginning of the trial runs.

*Example II*

Effluent from the catalytic dehydrogenation of ethylbenzene containing 23.5 weight per cent styrene inhibited with .1% tertiary butyl catechol was fractionated in a fractionator containing the equivalent of 100 theoretical plates. The fractionator was operated at a pressure of 16 pounds per square inch absolute. Styrene of 99% purity was withdrawn from a point in the lower section of the fractionator while ethylbenzene, together with small amounts of benzene and toluene were taken overhead as vapors. Polymer was removed from the kettle in proportions such that an appreciable loss of styrene was represented. Ammonia, hydrogen sulfide, aliphatic amines, alkyl hydrazines, alkyl sulfides, and mercaptans were successively introduced to the base of the fractionator with the result that the polymer formation was greatly decreased.

*Example III*

In the steam distillation of styrene for purification and removal of high boiling inhibitor the still or pot and the associated fractionating column filled with Raschig rings was heated to 100° C. with live steam. Styrene inhibited with phenyl-beta-naphthylamine was charged to the still in 40 pound batches as it distilled so that no more than 5 gallons of styrene was in the pot at any time. The distillation with steam continued for two hours and forty-five minutes, during which time 200 pounds of styrene was charged to the still. Of this amount 180.5 pounds of styrene was recovered, representing a loss of 9.8% during the distillation. Polystyrene was carried into and deposited in the column. The distillation was continued an additional 4 hours during which 162 pounds of styrene was charged to the still. The distillation was considerably slower than previously due to polymer deposition in the column. The loss at the slower distillation rate was somewhat less, being about 2.5%. Following this distillation the still had to be shut down for cleaning. The perforated plate supporting the Raschig rings was found to be nearly completely plugged with polymer.

Styrene, inhibited by the addition of mixed aliphatic amines boiling within the range of 290–300° F., was distilled in the apparatus. In six hours operation 400 pounds of styrene was charged to the still. The loss due to polymer formation was reduced to less than 1%.

*Example IV*

A C4 fraction containing butadiene admixed with butylenes, isobutylene and butane was passed into countercurrent contact with furfural containing 5% water in a plate-type absorption column. The column was operated at 65 pounds per square inch absolute with a top temperature of 120° F. and a bottom temperature of 240° F. The C4 fraction contained .02% phenyl-beta-naphthylamine inhibitor. In a few hours the system was shut down because of the formation of polymeric material in the lower section of the column.

Using methylamine inhibitor, together with the phenyl-beta-naphthylamine the furfural solvent extraction of butadiene from the C4 hydrocarbons was successfully carried out with very little polymer formation. The methylamine was partly absorbed in the furfural. Traces of methylamine were removed from the purified butadiene by intimate contact with an aqueous acid solution.

*Example V*

A mixture containing 50% butadiene along with a substantial proportion of butenes as impurities is fed to the center of a sixty plate bubble cap column and 95% acetone is supplied to the top of the column in quantities ten times the weight of the feed. Hydrogen sulfide is introduced near the bottom of the column and passes overhead substantially unabsorbed by the acetone. The liquid flowing from the bottom of the column is heated to boil out the purified butadiene and is recirculated, while a portion of the butadiene vapor is returned to the bottom of the column to maintain the saturation of the descending solvent. The remainder of the butadiene recovered from the solvent is condensed and removed as the product. In this manner the butadiene is easily enriched to 95% concentration. On inspection of the apparatus, substantially no gum polymer is detected. This is apparently due to the incorporation of the inhibitor, since a similar run under ordinary conditions without inhibitor results in noticeable gum or polymer formation, particularly after continued operation.

*Example VI*

The butadiene-containing mixture of the foregoing example is contacted in the apparatus of the foregoing example with nitrobenzene at 10 to 20° C. The rate of feed of the solvent and gas mixture is regulated so that substantially no butadiene is present in gases escaping at the top of the tower. The butadiene recovered from the solvent accumulating at the bottom by distillation as in Example V is of high purity, being in the neighborhood of 95% pure. Ammonia is used as inhibitor. As in Example V, no appreciable polymer formation takes place.

I claim:

1. In the fractional distillation of a liquid polymerizable organic compound in a fractionation zone wherein said compound is subjected to conditions favorable to oxidation of said compound, the improvement which comprises introducing into said fractionation zone an oxidation inhibitor substantially non-volatile under conditions of distillation in an amount sufficient to inhibit oxidation and polymerization of said compound in the liquid state, and continuously introducing into said fractionation zone a second oxidation inhibitor more volatile than said organic compound in an amount sufficient to inhibit oxidation and polymerization of said compound in the vapor state.

2. In the fractional distillation of a liquid polymerizable organic compound in a fractionation zone wherein said compound is subjected to conditions favorable to oxidation of said compound, the improvement which comprises introducing into said fractionation zone an oxidation inhibitor substantially non-volatile under conditions of distillation in an amount sufficient to inhibit oxidation and polymerization of said compound in the liquid state, and continuously introducing into the base of said fractionation zone a second oxidation inhibitor more volatile than said organic compound in an amount sufficient to inhibit oxidation and polymerization of said compound in the vapor state.

I. LOUIS WOLK.